Dec. 30, 1924.
W. G. BECKERT
HOT WATER REGULATOR
Filed Aug. 26, 1922
1,520,848
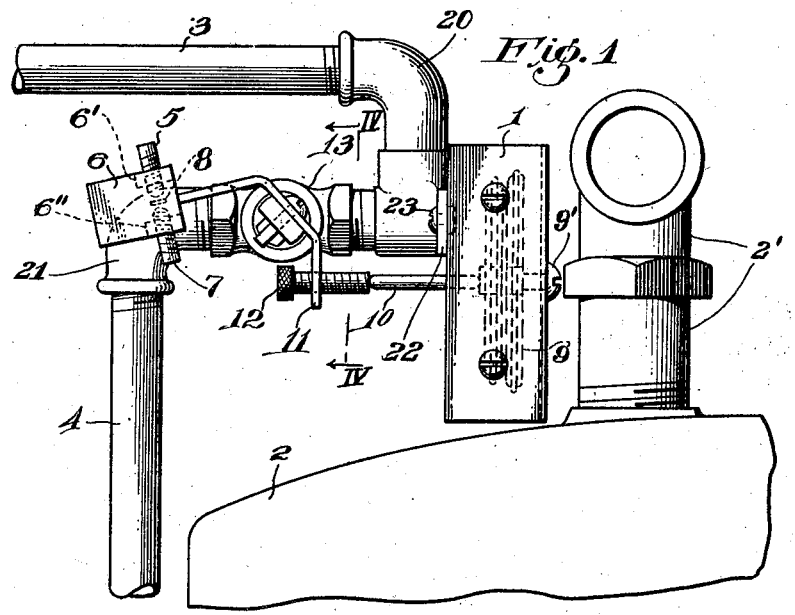
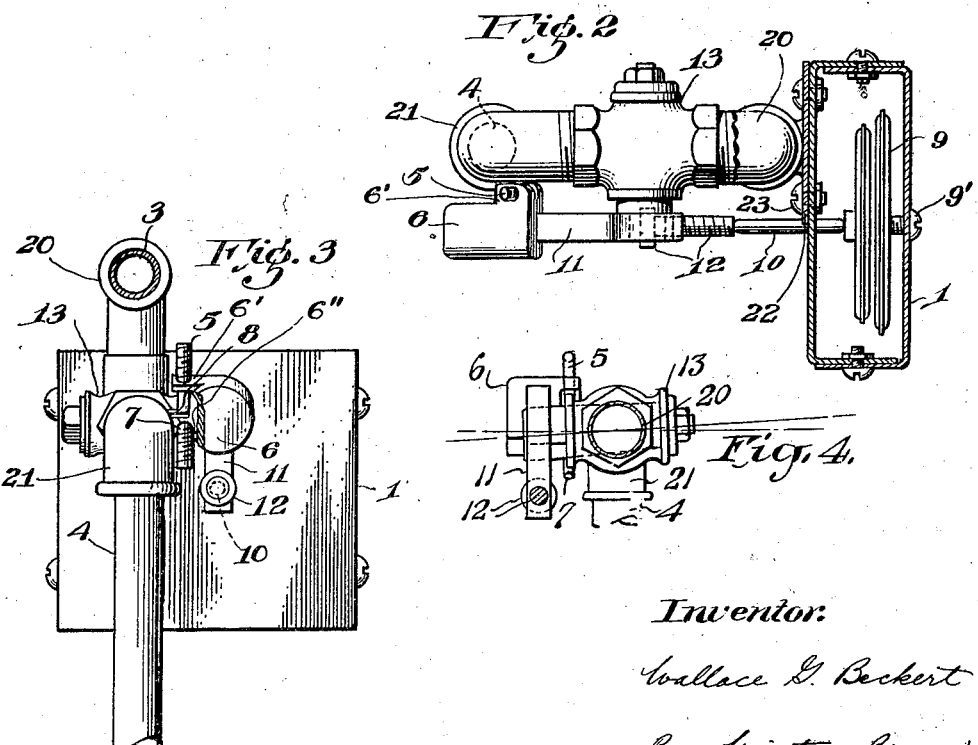
Inventor:
Wallace G. Beckert
By Winter & Brown
His Attys.

Patented Dec. 30, 1924.

1,520,848

UNITED STATES PATENT OFFICE.

WALLACE G. BECKERT, OF CORAOPOLIS, PENNSYLVANIA.

HOT-WATER REGULATOR.

Application filed August 26, 1922. Serial No. 584,523.

*To all whom it may concern:*

Be it known that I, WALLACE G. BECKERT, a citizen of the United States, and a resident of Coraopolis, in the county of Allegheny and State of Pennsylvania, have invented certain new and useful Improvements in Hot-Water Regulators, of which the following is a specification.

This invention relates to control apparatus, and particularly to a thermostatic control adapted for use in connection with hot water supply systems.

It is an object of the invention to provide a thermostatic control apparatus of this character which is simple, compact, durable, easily installed, economical to manufacture, and highly efficient in operation.

It is a special object to provide a thermostatic control adapted for use with hot water supply tanks in which the entire apparatus forms a unit directly associated with and carried by the conduit containing the element to be actuated for governing the flow of fluid through the conduit, and which can be readily inserted and removed as a unit from the gas supply pipe for the burners ordinarily employed in connection with hot water storage tanks now commonly used for domestic purposes.

Further special objects are to provide such an apparatus having the thermostatic or temperature responsive element located so as to secure regulation in accordance with the temperature of the hot water dispensed or in accordance with the temperature thereof at its point of delivery from the storage tank, one which is effective for this purpose without necessitating the insertion of parts of the control apparatus in the storage tank itself or the conduits connected thereto, or in any way requiring auxiliary connections, changes or alterations therein, one in which the temperature responsive element is rendered highly sensitive while at the same time suitably supported, disposed, and protected against injury, one in which the flow of fluid controlled is governed to a nicety within predetermined limits while at the same time precluding either a total cutting off or an excessive increase in flow thereof, one which can be easily adjusted to secure differences of regulation within the ranges for which the particular apparatus is designed, and one in which the parts are relatively positioned to assist in maintaining the movable elements in proper operative condition.

In the accompanying drawings, illustrating the preferred embodiment of the invention, Fig. 1 is a fragmentary elevational view showing the upper portion of the hot water storage tank together with the thermostatic control apparatus comprising the subject matter of this invention and the relative disposition thereof; Fig. 2 a fragmentary plan view of the parts comprising the thermostatic control apparatus, some of the parts being shown in section; Fig. 3 a side elevation of the parts illustrated in Fig. 2; and Fig. 4 a fragmentary view showing the inclination of the axis of the valve to the horizontal.

In the drawings, the hot water storage tank is indicated at 2, and which is provided with the usual discharge conduit 2' located centrally of its top for the purpose of conducting the hot water to the point of use. The water within the tank is heated by means of a heater or burner associated therewith in any of the conventional ways well known in this art, such burners being most commonly positioned at one side of the tank and adjacent its lower end.

The gas for the burner or heater is supplied through the conduit 3—4, in which is interposed a tapered rotary plug valve 13, the gas entering the pipe 3 passing in turn through the valve and the pipe 4 on its way to the burner. The casing of the valve 13 is of a well known form, as illustrated in the drawings, and is connected to the pipes 3 and 4 by means of the elbows 20 and 21, respectively. The elbow 20 is provided with an attaching plate or lug, such as shown at 22, to which is anchored by means of suitable screw bolts 23, a tubular shell or casing 1 which is open at both its upper and lower ends. The shell 1 is preferably located directly over and in close proximity to the top and center of the storage tank 2, as clearly shown in Fig. 1. Disposed within and supported by the shell 1 is an expansible and contractible bellows-type of thermostat 9, the body of the thermostat being preferably anchored in the manner shown by means of an anchoring screw bolt 9'. Thermostat 9 is of a well known conventional form consisting of a bellows construction filled with a volatile liquid which upon being heated causes expansion and lengthening of the bellows, while upon a fall of temperature the bellows shortens and tends to resume its original length. Contacting the thermostat at the end thereof opposite its anchoring screw bolt 9′ is a rod 10 which passes through a suitable opening provided in the side of the shell 1.

The body of the tapered plug valve 13 is slightly inclined to the horizontal, with its larger extremity pointing downwardly, and has attached to such larger extremity a lever 11. The lever 11 is attached to the valve intermediate its ends and has the oppositely extending arms thereof bent so as to lie at substantially right angles to each other, as clearly shown in Fig. 1. Integrally formed as a part of one arm of the lever is a weight 6 which is equipped with a pair of spaced apart lugs 6′, 6″ extending laterally therefrom. The lug 6′ has threadedly engaged therewith a screw bolt 5, and the lug 6″ is likewise equipped with a similar screw bolt 7. Fixed to the elbow 21 and extending into the space between the lugs 6′, 6″ so as to lie in the path of movement of the screw bolts 5 and 7, is a limiting abutment 8. Threadedly engaging the arm of the lever opposite to that by which the weight 6 is carried is an adjustable abutment block 12 which is so positioned as to be contacted by the extremity of the rod 10 projecting from the thermostat 9.

The operation of the apparatus is as follows: With the parts operatively associated and relatively positioned in the manner described, whenever the water within the storage tank 2 reaches a predetermined high temperature, the heated air immediately above the storage tank in passing upwardly through the tubular shell 1, causes an expansion of the thermostat 9, which in turn projects the rod 10 towards the left, as viewed in Figs. 1 and 2. Movement of rod 10 in this direction due to its abutment with the block 12 carried by the lever 11 rotates the valve 13 in a clockwise direction, moving the same to its closed condition and cutting off the supply of gas to the burner or heater supplied through the conduit 3—4. Likewise, upon a fall of the temperature of the water in the storage tank 2, which results from the withdrawal of the hot water therefrom and the refilling of the tank with cold water, in a well known fashion, the thermostat 9 will contract and release the rod 10, permitting the weight 6 to rotate the valve 13 anticlockwise so as to move it to open condition, and increase the flow of gas to the burners through the conduit 3—4.

The screw bolts 5 and 7 are adjusted to positions so that the screw bolt 7 will contact the abutment 8 to limit the closing movement of the valve 13 at a point prior to the entire cutting off of the gas supply for the purpose of always maintaining a small flame thus precluding danger of the flame being entirely extinguished. The screw bolt 5 is adjusted so as to arrest opening movement of the valve at any desired point thus precluding an excessive amount of gas being supplied to the burners during the operation of the apparatus. The adjustments of the screw bolts 5 and 7 are made after the abutment block 12 has been positioned at the desired point, and to secure the normal operation desired.

By rotating the abutment block 12 so as to bring it closer to or farther from the thermostat, the temperature of the water within the storage tank 2 may be varied at will, within the range for which the apparatus is designed, in an obvious fashion.

It is noted that with an apparatus such as described the association of the various elements forms an entity or unit which may be readily inserted and removed from the gas supply conduit 3—4, the thermostatic temperature controlling element 9 is positioned so as to secure regulation of the control valve 13 in accordance with the temperature of the water in the tank at the point at which it is dispensed, the thermostat is conveniently suspended in operative position from the gas supply conduit in a manner to render it highly sensitive while preventing injury thereto, and the valve 13 is positioned relatively to the remaining parts in such manner that it is prevented from sticking due to the influence of the weight 6 attached to the valve lever 11, and that the influence of the weight 6 upon the valve plug is unhampered due to the abutting contact provided between the rod 10 and the block 12.

I claim:

1. A thermostatic control apparatus comprising a conduit, a valve in said conduit, a tubular shell fixed relatively to the valve, said shell being open at both ends whereby to permit free passage of air therethrough, a thermostat mounted within the shell, said shell being provided with a guide opening intermediate its ends, a floating rod threaded through said opening interposed between said valve and thermostat, and means for simultaneously tending to move the valve to its open condition and the floating rod towards the thermostat.

2. The combination of a hot water storage tank, a conduit for supplying fuel to heat the tank, a valve in said conduit, a thermostat connected to the conduit and positioned immediately above and closely adjacent the storage tank, and operative connections between the thermostat and valve, the said conduit, valve, thermostat and connections forming a unit readily removable without disturbing the said tank.

3. A thermostatic control apparatus comprising a conduit, a rotary valve interposed therein, a lever fixed to the said valve and carrying a weight at one end thereof tending to rotate the valve in one direction, an adjustable abutment block carried by the lever, and a rod projecting from the thermostat and contacting the said block whereby to rotate the valve in the opposite direction against the influence of said weight.

4. A thermostatic control apparatus comprising a conduit, a rotary tapered plug valve interposed therein, the axis of said plug being inclined to the horizontal with the larger end of the plug directed downwardly, a lever fixed to said valve, a weight at one end of the lever tending to rotate the valve in one direction, a thermostat, and a rod adjacent the thermostat and projecting therefrom into contact with the said lever whereby to rotate the valve in the opposite direction.

5. A thermostatic control apparatus comprising a conduit, a rotary plug valve interposed therein, a lever attached intermediate its ends to the said valve, a weight fixed to one arm of the lever tending to rotate the valve in one direction, a thermostat, a rod adjacent the thermostat and projecting therefrom into abutting contact with the other arm of the lever whereby to rotate the valve in the opposite direction, a pair of spaced lugs projecting from the weight, a limiting abutment on the conduit projecting into the space between the said lugs, and adjustable screw bolts in said lugs adapted to contact the limiting abutment whereby to limit the rotary movement of said valve in either direction.

6. A thermostatic control apparatus comprising a conduit, a rotary valve interposed therein, a lever attached intermediate its ends to the said valve, a weight carried by one arm of the lever tending to rotate the valve in one direction, spaced lugs on the weight, adjustable screw bolts in said lugs, a stationary limiting abutment disposed between the adjacent extremities of the screw bolts, an expansible and contractible thermostat, a tubular shell surrounding the thermostat, and a rod projecting from the thermostat into abutting relation with the other arm of the lever.

In testimony whereof, I have hereunto set my hand in presence of two subscribing witnesses.

WALLACE G. BECKERT.

Witnesses:
 THEODORE F. BECKERT,
 WILFRED C. BECKERT.